May 7, 1957

G. NATTA 2,791,290

CONTINUOUS PROCESS FOR THE SEPARATION OF
COMPONENTS FROM AN AT LEAST TERNARY GAS
MIXTURE BY MEANS OF SOLVENT EXTRACTION

Filed May 8, 1953

$p5 = p1 > p2 \leqq p4$
$p4 \leqq p1$
$p1 = p2$

INVENTOR.
Giulio Natta
BY
Knight Bros.
Attorneys

United States Patent Office 2,791,290
Patented May 7, 1957

2,791,290

CONTINUOUS PROCESS FOR THE SEPARATION OF COMPONENTS FROM AN AT LEAST TERNARY GAS MIXTURE BY MEANS OF SOLVENT EXTRACTION

Giulio Natta, Milan, Italy, assignor to Montecatini, Società Generale per l'Industria Mineraria e Chimica, a corporation of Italy Application May 8, 1953, Serial No. 353,715

Claims priority, application Italy May 21, 1952

7 Claims. (Cl. 183—115)

The present invention relates to a new, continuous process for the separation of components from an at least ternary gas mixture by means of solvent extraction.

In the chemical industry, absorption with solvents is largely used for extracting soluble components from gas mixtures. However, if such mixtures contain several components which are soluble in the solvent, it has been difficult to completely separate at least one of the components, except by having recourse to complicated and expensive operations.

In general, such operations are not carried out as isothermal processes, because the solvent requires heating prior to re-use. Moreover, the solvent must be degassed at reduced pressure in order to obtain an efficient extraction and purification of the desired gaseous component.

The herein disclosed process permits the separation of a desired component (hereinafter designated as gas A) in a substantially pure or, at least, highly enriched state, and at high yields, by means of applying a selective solvent. The process may be used even if the desired gas component A is mixed with another gas or other gases (hereinafter designated as gas B), also soluble in the employed solvent, but to a lesser degree than gas A.

The process of this invention can be carried out under substantially isothermal conditions and, generally speaking, involves the newly discovered principle of enriching a solvent solution with the desired gaseous component A and separating gaseous components B by means of stripping the solvent solution enriched with gas A by means of an inert gas I. The term "inert gas" is to designate a gas which is practically insoluble in the selected solvent.

The herein disclosed process is based on the entirely unexpected discovery that it is possible to remove from a solvent solution enriched with a more soluble gas A a less soluble gas B by means of adding an inert gas I, without thereby substantially reducing the concentration of the gas A in the solvent.

These and other features of my invention as well as further objects and advantages will be apparent from, and will be referred to in, the following description in conjunction with the accompanying drawings, in which.

Figure 1:
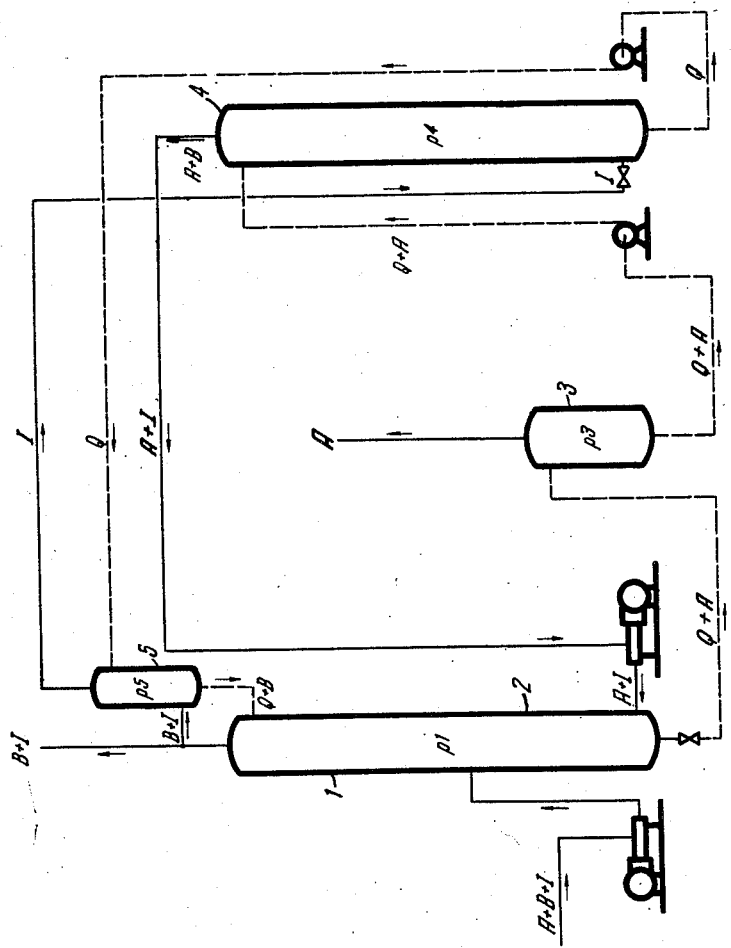
Figs. 1 and 2 are diagrammatic flow sheets of the herein disclosed process.
Figure 2:
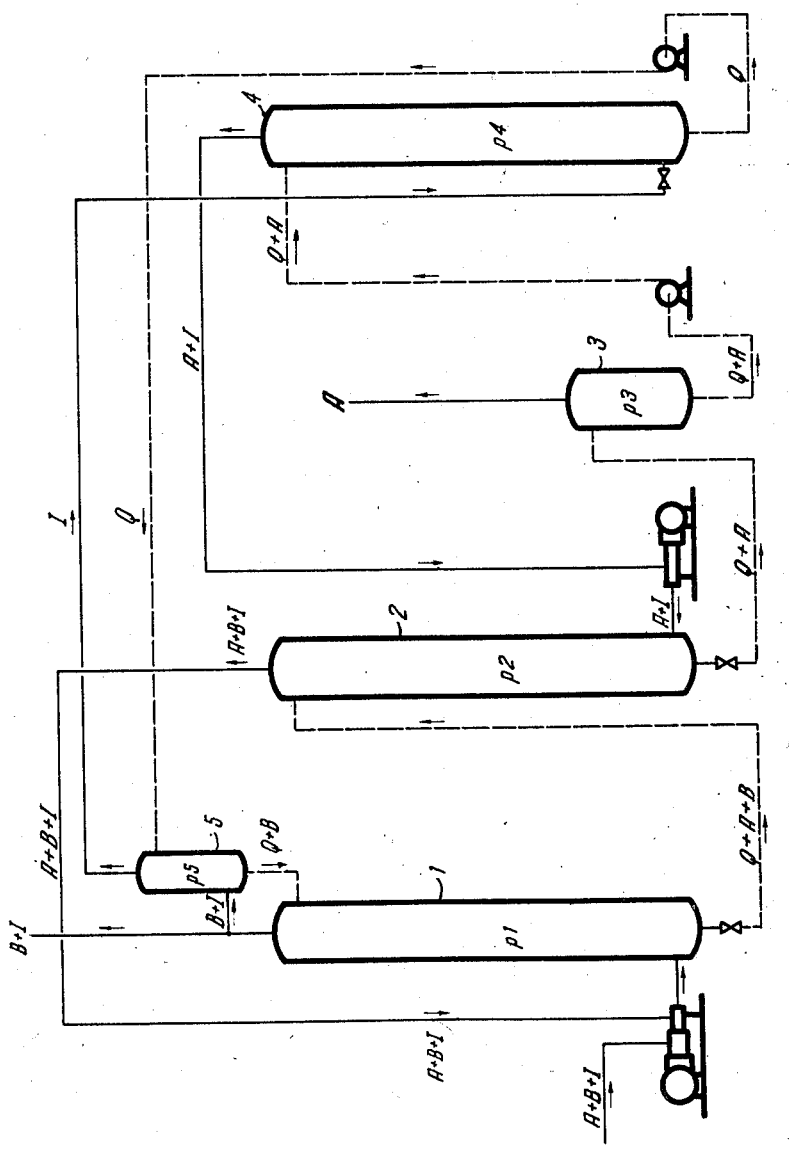

The flow sheets depicted in Figs. 1 and 2 illustrate the herein disclosed separation process. Both comprise an absorption stage 1 and a fractionating stage 2. The only difference between the flow sheets is that in Fig. 1 the absorption column 1 is mounted on top of the fractionating column 2, while in Fig. 2 these two columns are separated and mounted at the same level.

In the absorption column 1, a mixture of the gases $A+B+I$ is treated countercurrently with a suitably selective solvent which, for subsequently explained reasons, may already contain some of the less soluble gas B. The mixture of these three gases is introduced at the bottom of the absorption column 1. According to Fig. 1, the feed inlet is about at the middle of the joint absorption and fractionation column while, according to Fig. 2, a portion of the gaseous mixture $A+B+I$ which is discharged from the top of the fractionating column 2, is recycled and introduced at the bottom of the absorption column 1, together with a new portion of the gaseous mixture $A+B+I$.

The fractionating or enriching column 2 may be operated at the same pressure as the absorption column 1, particularly when operating according to the scheme illustrated in Fig. 1. Preferably, however, the fractionating column 2 is operated at a lower pressure (Fig. 2).

The fractionating column 2 is fed from the top with a solution of the solvent soluble gases $A+B$, either by gravity from the absorption stage 1 (Fig. 1) or by means of a conduit and propelling means (not shown) from the bottom of the absorption column 1 to the top of the fractionating column 2 (Fig. 2). The degasifier 3 and the stripping column 4 are identical in the two illustrations. A mixture consisting of a portion of gas A and inert gas I taken off at the top of the stripper 4 is refluxed and entered at the bottom of column 2 to rise therein in countercurrent with a solvent solution of the soluble gases. As a result, the discharge at the bottom of the fractionating column 2 consists of an enriched solvent solution of the more soluble gas A, while the discharge from the top of the fractionating column consists of a mixture of the three gases A, B, and I.

The solvent discharged at the bottom of the degasifier 3, being either substantially pure or containing only relative small amounts of the more soluble gas A, is passed to the top of the stripipng column 4, while inert gas I, preferably representing a portion of the gaseous mixture $B+I$, discharged at the top of the absorption column 1, is entered at the bottom of the stripping column 4. Prior to entering the bottom of the stripping column 4, the gaseous mixture $B+I$ is passed through a washer-separator 5 where it is washed with solvent Q taken off at the bottom of the stripping column 4 and subsequently entered at the top of the absorption column 1. In this manner, most of the gas B is removed from the mixture $B+I$. Therefore, upon entering the bottom of the stripper 4, the inert gas I is substantially pure. The solvent passing down the stripper and containing a portion of the more soluble gas A is stripped by the inert gas I rising from the bottom of the column and is discharged for recycling, first through the washer 5 and then to the top of the absorption column 1, while the mixture of stripped gases $A+I$ is recycled, as previously mentioned, to the bottom of the fractionating column 2, preferably after suitable compression from the lower pressure of the stripper 4 to the higher pressure of the fractionating column 2.

It is obvious that, as a modification of the process, substantially pure solvent Q recovered at the bottom of the stripper 4 may be recycled directly to the absorption column 1, while the inert gas required for the stripping action can be obtained from the gaseous mixture $B+I$ by washing the mixture with a separate portion of a suitable solvent, maintained within an independent washing and recovery cycle.

One particularly unexpected feature of the cyclic process illustrated in the flow diagrams is that a solution of the desired gas A, highly concentrated and practically free from the less soluble component B, is obtainable without the necessity of increasing the volumetric ratio between the gas A and the inert gas I in the refluxed mixture over the ratio of these two gases in the feed mixture $A+B+I$. Thus, in order to obtain a solution $Q+A$ which is practically free of gas B, only relatively small quantities of gas A are needed for the reflux, contrary to prior processes involving extractive distillations.

If, as illustrated in Fig. 2, the fractionating column 2 is separated from the absorption column 1, the former may be operated under a pressure $p_2$ which is lower than the pressure $p_1$ of the absorption column. As a result, the concentration of the component A in the gaseous reflux mixture $A+I$ may be increased, while the amount of inert gas I therein is considerably reduced. Thus, since the gaseous reflux mixture $A+I$ has a higher concentration of gas A, a smaller amount of the gaseous reflux mixture is required in this case. On the other hand, it is advisable to operate the fractionating column 2 at a higher pressure if gaseous mixtures are to be separated which have a relatively low concentration of the more soluble gas A.

In any case, when using an inert gas I, the amount of gas A which is necessary to remove the less soluble gas B from the solution within the fractionating column 2 is lower than the amount which would be required if the less soluble gas B were to be removed in the absence of an inert gas I, such as by extractive distillation or by fractional absorption. The amount of inert gas I included in the gaseous reflux mixture may be less than the amount which would be necessary to strip the same quantity of less soluble gas B at the pressure $p_2$ from a hypothetical solution containing none of the more soluble gas A. On the other hand, if the gaseous reflux of the present process would consist of the inert gas I only, it would remove from the solution not only the less soluble gas B, but also much more of the more soluble gas A. Therefore, the addition of a certain amount of gas A to the reflux gas greatly reduces the amount of gas A removed from the solution. Once the amount of the more soluble gas A in the reflux gaseous mixture $A+I$ has been established, the ratio between these two gases remains constant throughout the recycling process. However, too great an excess of the amount of gas A in the gaseous reflux mixture $A+I$ is not desirable, since no operative advantages are obtained thereby. In order to recover the desired component A, in practically pure or, at least, highly concentrated form, the effluent solution $Q+A$ from the fractionating column 2 is subjected to a degasification by means of a suitable pressure drop without the need of resorting to heating in every instance.

Referring now in more detail to the flow diagram illustrated in Fig. 2, which permits operation of the fractionating column 2 at a lower pressure than that of the absorption column 1, a feed mixture of the gases $A+B+I$, together with a similar mixture $A+B+I$ recycled from the top of column 2, is compressed and entered near the bottom of column 1, while at the top this column is charged with solvent Q which may contain some of the less soluble gas B absorbed while passing through the washer 5.

The solution issuing from the bottom of the absorption column 1 is passed to the top of the fractionating column 2, where it is contacted in countercurrent with a rising gaseous mixture $A+I$ originating from the top of the stripper 4.

Within the fractionating column 2, the less soluble gas B is removed and the solvent effluent containing only the desired gaseous constituent A is passed from the bottom of column 2 to the degasifier 3, operated at a pressure $p_3$ which must be lower than the pressure $p_2$ of column 2, provided the degasifier is not heated. The desired gas A which is thereby liberated from the solution is discharged at the top of the degasifier as the principal end product of the process.

The solvent Q which, after degasification, still contains a small amount of gas A, is admitted, if necessary after suitable compression, to the top of the stripping column 4 in which it is contacted countercurrently with inert gas I, fed to the bottom of the column.

The regenerated solvent Q, which is now substantially free of dissolved gases, is withdrawn from the bottom of the stripping column 4 and, after suitable compression, is recycled to the top of column 1.

In order to operate efficiently, it is important that the regenerated solvent Q which is returned to the absorption column, shall contain none of the gas A in order to avoid any discharge of gas A from the top of the absorption column 1 together with the residual gases I and B of the initial mixture.

The residual gases $I+B$ may be used to provide the inert gas I, which is fed to the bottom of the stripping column 4, by first removing the less soluble component B within the washer-separator 5.

All or a part of the solvent Q, recycled from the bottom of the stripping column 4 to the top of the absorption column 1, may be used for this purpose.

The mixture of inert gas I and desired gas A discharged at the top of stripping column 4, is suitably compressed and returned to the bottom of the fractionating column 2, after adjusting the composition of this gaseous mixture, if necessary.

The rate of degasification of the solution $Q+A$ within the degasifier 3 may be increased by means of moderate heating. For example, it may be advisable in some instances to operate the degasification stage at a temperature of about 30 to 40° C. The heat necessary for this purpose is often readily available in form of waste heat from other operations of the plant. If the efficiency of degasification is increased in this manner, the solution $Q+A$ passing from the degasifier to the stripping column 4 will contain a smaller amount of the gas A than at an isothermic operation. Consequently, the amount of inert gas I fed to the bottom of the stripping column 4 should be reduced proportionately.

Moreover, when heating the degasifier 3, the absorption column 1 and the fractionating column 2 may be operated at lower pressures than in the isothermal cycle because the operation of the degasifier at a higher temperature may be regarded as equivalent to the operation at a lower pressure.

The operating pressures within the several columns may vary within wide limits, but the alteration of one or more of these pressures will generally necessitate corresponding alterations in the quantity of the solvent Q and the quantity and composition of the reflux gas $A+I$.

It is obvious that the herein disclosed process may be modified in several ways. Thus, the insoluble gas component of the reflux mixture may be supplied or partially supplied from other sources, independent of the gaseous mixture fed to the absorption tower.

As a further modification, the gas entering at the bottom of the fractionating column may be obtained by means of washing a mixture of the less soluble gas and the inert gas discharged from the absorption column. Or at least a portion of the mixture of the less soluble gas and the inert gas discharged from the absorption column is washed with regenerated solvent in order to return the solvent solution of the less soluble gas to the absorption column and the inert gas to the bottom of the fractionating column.

Moreover, the composition of the recycled gas obtained in the foregoing manner may be corrected by the addition of an amount of the more soluble gas before recycling to the fractionating column.

In order to select the most suitable values for the process variables, the most important of which is the quantity of required reflux gas $A+I$, it is necessary to know the solubilities of the different components of the feed mixture in the selected solvents.

A new type of graphic charts has been developed which permits one to determine or, at least, to approximately determine, the equilibrium conditions required in stripping a solution containing several dissolved gases by means of a gaseous reflux comprising an inert gas. The chart presented in Fig. 3 relates to a situation in which one solvent and three gases, two of them being soluble gases and one an insoluble (inert) gas are involved. A indicates the gaseous component which is most soluble in the solvent and which is to be separated, B represents a less soluble component of gaseous mixture which is to be fractionated, while I indicates the insoluble component (inert gas) and Q designates the solvent.

The chart refers to a mixture of gases which follow Henry's law, wherein the ratio $\gamma$ between the solubility coefficient $\alpha$ of the gas A and the solubility coefficient $\beta$ of the gas B is 3:1.

For this purpose, the ordinate indicates the number of mols of the soluble gas A present in the gas phase plus the number of mols of the gas B present in the gas phase, both expressed in solubility equivalents A$e$ and B$e$ based on the solubility of the more soluble gas A, and divided by the number of mols of the inert gas I present in the gas phase. In order to express the number of mols of the less soluble gas in terms of solubility equivalents of the more soluble gas, the number of mols of the less soluble gas present in the mixture is multiplied by the ratio between the solubility of the more soluble gas and the gas in question.

Further details with respect thereto may be found in a paper by this applicant and one Mattei, in Chimica e Industria, 24, 271 (1942).

The abscissa indicates the sum of mols of dissolved gases $A+B$, likewise expressed in solubility equivalents A$e$ and B$e$, and divided by Q$e$, a convenient expression relating to the amount of solvent Q.

In order to convert the actual volume of the solvent Q into the above convenient terms, volumetric units of the solvent are multiplied by $\alpha$, the solubility coefficient of the more soluble gas A, or by the number of volume units of the gas A which can be dissolved in one volume unit of the solvent, when the partial pressure of that gas is equal to the total pressure.

The curves of the chart, executed in solid lines, indicate equilibrium conditions between the gas phase and the liquid phase for different ratios $A:B$ in the gas phase.

It is possible, therefore, to determine, by means of the chart, the composition of a liquid phase which will be in equilibrium with a given gas phase of the mixture.

As stated before, this particular chart refers to a ratio of 1 to 3 between the solubility coefficients $\beta$ and $\alpha$. Obviously, similar graphs may be prepared from experimentally determined equilibrium data of any other system.

Moreover, the trained operator is able to predict from the chart, at least quantitatively, what will occur when, at various points of the fractionating system, liquid and gaseous mixtures of different composition come into contact with each other.

Any straight line on the chart, passing through a representative point, such as the point F, constitutes an operating line of constant ratio between the amount of solvent Q and the amount of inert gas I. It is important to know which of these operating lines indicate, at least, the theoretical possibility of removing gas B from the solution, under ideal circumstances, using an infinite number of plates and with equilibrium conditions existing at the top and the bottom of the fractionating column.

In many instances, such as an operating line will be found to be a tangent to a curve indicating a constant ratio $A:B$, whereby the tangent passes through the representative point, for example, the point F as in the case of the tangent to the curve $A:B=1$.

Assuming that a solution enters the top of the fractionating column 2, there will be a point, such as the point F, the abscissa reading of which indicates the composition of the solution, and the ordinate reading of which indicates the composition of the gas mixture containing inert gas I which is in equilibrium with that solution.

For the complete removal of the less soluble gas B from the solution, there are two possible compositions of the gas stream introduced at the bottom of the fractionating column 2.

Under ideal conditions, the two possible compositions of this reflux gas are indicated by the ordinates of points $R_1$ and $R_2$ at which the tangent, meeting the curve $A:B=1$ at F cuts through the curve A, the latter representing a state of conditions at which the gas phase does not contain any gas B.

The line F–$R_1$ has the singular property of representing each of the successive points from the top to the bottom of a fractionating column where, in the ideal case, equilibrium exists between the countercurrently moving gas and liquid phases, always assuming that the column comprises an infinite number of plates.

From a technological point of view, the most suitable conditions will be found at $R_1$.

In practice, the theoretical result is more or less closely approached, depending upon the number of plates in the column, efficiency of the plates and the amount of reflux gas which is used in excess of the theoretical amount. With packing towers, the practical results depend upon the height of the column and the efficiency in comparison with a known plate column.

Theoretically, when using a 20% reflux excess, the operating line shifts to $R_1$—N. The slope of this line is less than that of the line F—$R_1$, because the slope is determined by the ratio between the amount of solvent Q and the amount of inert gas I in the gas phase.

In order to determine, at least with some accuracy, the least amount of solvent Q which will be necessary under ideal conditions, the following formula may be used:

$$Q=\frac{F}{p_1(\alpha-\beta)}$$

wherein $p$ is the total pressure in the absorption column 1 expressed in atms., F is the amount of gaseous mixture $A+B+I$ which is introduced (expressed in cubic meters at 1 atm. pressure) and wherein the amount of solvent Q is also expressed in cubic meters.

If $p_2$ (the pressure in the fractionating column 2) equals $p_1$, the amount of solvent Q which is necessary will be $$Q=\frac{F}{\alpha p_1-\beta p_2}$$

The amount of inert gas I which must be present in the reflux gas may be obtained from the following equation:

$$I_r=\frac{\gamma I_f}{(1-\gamma)}$$

in which $I_f$ is the amount of inert gas which must be introduced with the feed gases, and $\gamma=\beta/\alpha$.

Figure 3:
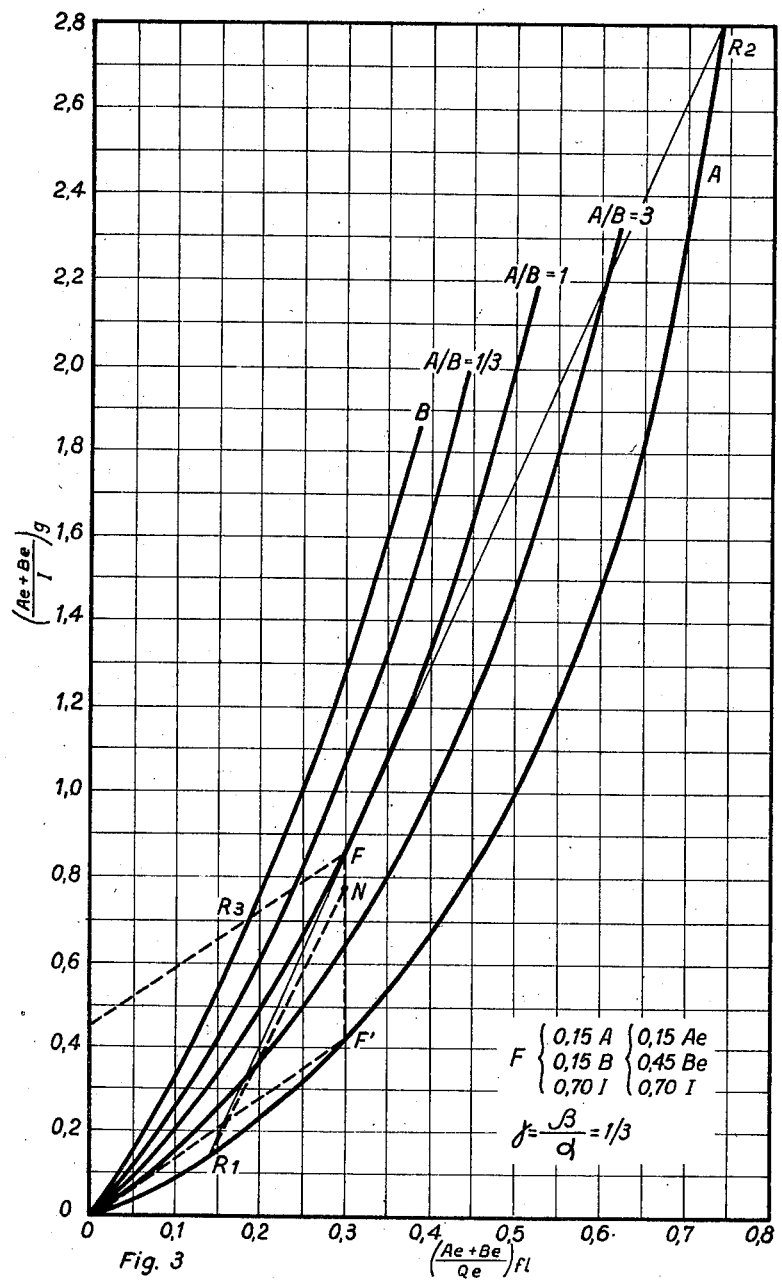
Fig. 3 is a chart depicting the relationship between liquid and gaseous phases of various compositions.

If, on the chart in Fig. 3, a straight line signifying a ratio Q$e$/I$r$ is traced through the point F, the intersections of that line with the curve A (which signifies the various equilibrium conditions of a gaseous mixture consisting of the more soluble gas A and the inert gas I, but without any gas B), indicate the two possible compositions of the gas which must be employed for the reflux.

Consequently, it is possible by means of the chart to determine the amount of gas A which is to be recycled to the bottom of the fractionating column 2. As has been previously mentioned, and as shown in Fig. 3, such a line may in certain cases be the tangent to a curve passing through the point F.

It will be advisable, in some instances, to operate the fractionating column P at a pressure $p_2$ which is much lower than that of the absorption column 1. For example $p_2$ may be ½ to ⅔ of $p_1$. Obviously, however, the pressure within the fractionating column 2 must always be higher than that of the degasifier, provided no heat is applied to the latter.

It should be noted that where the fractionating column is operated at a pressure which is lower than that of the absorption column, the above equations for Q and $I_r$ are not applicable.

In this case, the solution entering the fractionating column 2 can be determined by multiplying the preceding abscissa reading with $$\frac{p_1}{p_2}$$

The mode of operation will be the same as before, except that the reference point F is located appreciably higher on the curve $A/B$=constant. Naturally, the amount and composition of the reflux gas will differ from that of the reflux gas previously considered.

The chart also permits a determination of the theoretical amount of solvent which should be supplied to the absorption column.

As shown, the ratio between the solvent Q and the inert gas I is determined by the slope of a straight line $F-R_3$ (in which $R_3$ is the point at which the line transects the curve B indicating conditions of equilibrium between the gas phase and the liquid phase when the gas phase contains none of the more soluble component A). The line $F-R_3$ is drawn parallel to a line $F_1-O$ which extends from O through a point $F_1$ which has the same abscissa as the point F and is a point at the equilibrium curve for pure gas A.

The ordinate reading of point $R_3$ indicates the theoretical composition of the gas leaving the top of the absorption column 1, provided $p_1$ equals $p_2$.

In cases where Henry's law is not applicable, the various points of the chart should be determined experimentally.

Example 1

A mixture containing 9% acetylene (gas A), 4% carbon dioxide (gas B) and 87% of insoluble or inert gases (gas I), chiefly carbon monoxide and hydrogen, as obtained by oxidation of methane with oxygen, is compressed to 35-40 atm. and washed in countercurrent in a bubble plate absorption column 1, using 0.31 volume of ethylene glycol diacetate for every 100 normal volumes of the initial feed gas mixture. Into the same column there is also introduced together with said feed gases a reflux gas having the same constituents, coming from the top of the fractionating column 2.

The solvent solution of gases A and B which leaves the bottom of the absorption column 1 is sent to the top of the fractionating column 2, which is also of the plate type and is adapted for operation at a pressure of 16-17 atm. Into the bottom of this column there is fed a gaseous reflux from the top of the stripping column 4 consisting of a mixture containing 18-20% acetylene, the remainder consisting of the inert gases carbon monoxide and hydrogen. The volume of this reflux gas is 23 normal volumes, and the amount of acetylene contained in the reflux is, therefore, 4.6 volumes for every 100 volumes of the feed mixture.

The solution issuing from the bottom of the fractionating column 2 and containing only gas A is admitted into the degasifier 3 at a pressure of 1.2 atm. absolute, where, as a result of the pressure reduction, acetylene is liberated as an end product which is almost free from carbon dioxide.

After having been degasified at the pressure of 1.2 atm. absolute, the solvent still contains some acetylene and is sent to the top of the stripping column 4, which is packed with Raschig rings, and is therein treated in counter-current with about 18 normal volumes (for each 100 volumes of feed mixture) of a mixture of carbon monoxide and hydrogen at atmospheric pressure.

The gas mixture issuing from the top of the stripping column 4 is compressed to 17 atm. to permit recycling to the bottom of the fractionating column 2.

The cycle as described required no heating of the solvent by external means and may be considered as practically isothermal.

It is noteworthy that if the reflux gas used to liberate carbon dioxide from the solution entering the fractionating column 2 were to consist of acetylene not diluted with inert gas, this column could not be operated at pressures higher than 1.4 atm. absolute, because of the highly explosive nature of acetylene. Under such conditions, an isothermal cycle would not be applicable except by operating the degasification stage at a pressure lower than atmospheric pressure.

Example 2

A gaseous mixture, having the same composition as the feed gas in Example 1, is washed in countercurrent with 0.65 volume of the same solvent for every 100 normal volumes of feed gas in the absorption column 1 at a pressure of 18 atm. Together with the feed mixture, there is also introduced the gas mixture issuing from the top of the fractionating column 2.

The solution leaving the bottom of column 1 is sent to the top of the fractionating column 2, which operates at a pressure of 7 to 8 atm. and is fed at the bottom with a gaseous reflux containing about 20% of acetylene and 80% of inert gases. The solution leaving the bottom of the fractionating column 2 is expanded to atmospheric pressure in the degasifier 3 and the degasification is enhanced by heating to about 50° C. Acetylene almost completely free from carbon dioxide is discharged from the degasifier as an end product.

The solution thus partially degasified is further and completely degasified in the column 4 by stripping with a mixture of inert gases (carbon monoxide and hydrogen) flowing in countercurrent and equivalent to 18 volumes for every 100 volumes of feed mixture supplied to column 1 (not including the volume of gas recycled from column 2).

The mixture of acetylene and inert gases issuing from the top of the stripping column 4 is compressed to 8 atm. and sent as reflux gas to the bottom of the fractionating column 2.

Example 3

A gaseous mixture having the same composition as that of Examples 1 and 2 is compressed to a pressure of 32 to 34 atm. and supplied as the feed mixture, together with a recycled gas mixture from the top of the fractionating column 2, for treatment in the absorption column 1 with 0.11 volume of dimethylformamide for every 100 volumes of said feed mixture.

The solution leaving the bottom of the absorption column 1 is sent to the top of the fractionating column 2 and a gaseous reflux containing about 20% acetylene and 80% inert gases is supplied to the bottom of said column which is operated at 12 atm. The volume of said reflux gas is about 8 volumes for every 100 volumes of fresh mixture admitted to the absorption column 1.

The solution leaving the bottom of the fractionating column 2 is expanded at atmospheric pressure with heating to 65° C. Acetylene, almost completely free from carbon dioxide, which is liberated in this manner, is discharged from the cycle as one of the end products. The partly degasified solution is then treated in the stripping column 4 with a countercurrent flow of a carbon monoxide and hydrogen mixture amounting to about 6.5 normal volumes for every 100 normal volumes of fresh feed mixture supplied to column 1.

Having described the nature and objects of my invention, what I claim is:

1. A continuous process for separating, by means of a selective solvent, a desired gas from an at least ternary gaseous mixture comprising said desired gas as the gas most soluble in the solvent, at least one second gas less soluble in said solvent and at least one third gas substantially insoluble in said solvent, said process comprising intimately contacting during an absorption stage, at a pressure higher than atmospheric pressure, said gaseous mixture with said solvent to absorb the most soluble gas and a portion of the less soluble gas, intimately contacting during a fractionating stage the solvent solution with a gaseous reflux mixture consisting of a portion of said most soluble gas and said substantially insoluble gas for removal of said less soluble gas from the solvent solution, adjusting said gaseous reflux to remove said less soluble gas without removing any of said most soluble gas from the solvent solution, passing the effluent from said fractionating stage, consisting of said solvent with a portion of said most soluble gas dissolved therein, through a degasification stage to liberate the larger part of said portion of most soluble gas, passing the effluent from said degasification stage through a stripping stage where said effluent is intimately contacted with a portion of said substantially insoluble gas to strip said solvent of residual amounts of said most soluble gas, and recycling the mixture of most soluble gas and substantially insoluble gas discharged from said stripping stage to said fractionating stage.

2. The process according to claim 1, wherein the pressure at said stripping stage is lower than the pressure at the fractionating stage and said mixture of most soluble gas and susbtantially insoluble gas discharged from the stripping stage is compressed to at least the pressure at the fractionating stage prior to entering said fractionating stage.

3. The process according to claim 1, wherein the ratio between the gases discharged from the stripping stage is readjusted before said gaseous reflux mixture enters the fractionating stage.

4. The process, according to claim 1, wherein the insoluble gas component of the mixture recycled to said fractionating stage comprises at least part of the insoluble gas discharged from said absorption stage.

5. A continuous process for separating, by means of a selective solvent, a desired gas from an at least ternary gaseous mixture comprising said desired gas as the gas most soluble in the solvent, at least one second gas less soluble in said solvent and at least one third gas substantially insoluble in said solvent, said process comprising intimately contacting during an absorption stage, at a pressure higher than atmospheric pressure, said gaseous mixture with said solvent to absorb the most soluble gas and a portion of the less soluble gas, intimately contacting during a fractionating stage the solvent solution with a gaseous reflux mixture consisting of a portion of said most soluble gas and said susbtantially insoluble gas for removal of said less soluble gas from the solvent solution, adjusting said gaseous reflux to remove said less soluble gas without removing any of said most soluble gas from the solvent solution, recycling a mixture of some of said most soluble gas, of some of said less soluble gas and of said insoluble gas, produced upon removal of most of said less soluble gas from the solvent solution during said fractionating stage to the absorption stage, together with an untreated portion of said gaseous mixture, scrubbing at least part of the mixture of less soluble gas and insoluble gas discharged at the absorption stage with a regenerated portion of said solvent, recycling the effluent of the scrubbing stage to the absorption stage and using the gaseous residue, consisting substantially of said insoluble gas, for stripping another portion of said solvent of residual amounts of said most soluble gas.

6. The process, according to claim 1, wherein said solvent solution of the most soluble gas is heated prior to the pressure reduction of the degasification stage and the portion of said most soluble gas liberated during the heating is combined with said gaseous reflux mixture consisting of another portion of said most soluble gas and of said substantially insoluble gas.

7. The continuous process of separating, by means of ethylene glycol diacetate as the selective solvent, acetylene as the desired component of a gaseous mixture comprising said acetylene as the gas most soluble in said solvent, carbon dioxide as the gas less soluble in said solvent, and carbon monoxide and hydrogen as the gases substantially insoluble in said solvent, said process comprising intimately contacting during an absorption stage said gaseous mixture with said solvent at a pressure between 35 to 40 atm. to absorb said acetylene and a portion of said carbon dioxide, intimately contacting during a fractionating stage the effluent from the absorption stage at a pressure of about 17 atm. with a gaseous reflux mixture consisting of a portion of said acetylene and said carbon monoxide and hydrogen for removal of said portion of carbon dioxide from the solvent solution, adjusting said gaseous reflux to suffice for the removal of said carbon dioxide without removing any of the acetylene from the solvent solution, degasifying the effluent from said fractionating stage at substantially atmospheric pressure and stripping the effluent from said degasifying stage by means of a portion of said carbon monoxide and hydrogen at substantially atmospheric pressure.

References Cited in the file of this patent

UNITED STATES PATENTS

| | | |
|---|---|---|
| 1,854,141 | Horsley | Apr. 12, 1932 |
| 2,146,448 | Scott et al. | Feb. 7, 1939 |
| 2,521,233 | Latchum, Jr. | Sept. 5, 1950 |
| 2,522,059 | Ray et al. | Sept. 12, 1950 |
| 2,540,905 | Neubauer et al. | Feb. 6, 1951 |
| 2,587,689 | Box, Jr. | Mar. 4, 1952 |
| 2,614,658 | Maher et al. | Oct. 21, 1952 |
| 2,623,611 | Levine et al. | Dec. 30, 1952 |

FOREIGN PATENTS

| | | |
|---|---|---|
| 29,750 | Great Britain | of 1896 |
| 611,224 | Great Britain | Oct. 27, 1948 |